(12) United States Patent
Watanabe et al.

(10) Patent No.: US 6,935,307 B2
(45) Date of Patent: Aug. 30, 2005

(54) DIESEL ENGINE

(75) Inventors: Kinichirou Watanabe, Kanuma (JP); Takashi Sakasai, Showa-machi (JP); Shouhei Nagasaka, Oyama (JP)

(73) Assignee: Komatsu Ltd., Tokyo (JP)

( * ) Notice: Subject to any disclaimer, the term of this patent is extended or adjusted under 35 U.S.C. 154(b) by 8 days.

(21) Appl. No.: 10/620,898

(22) Filed: Jul. 15, 2003

(65) Prior Publication Data

US 2004/0074471 A1 Apr. 22, 2004

(30) Foreign Application Priority Data

Oct. 16, 2002 (JP) ........................................ 2002-301806

(51) Int. Cl.⁷ .............................................. F02D 41/00
(52) U.S. Cl. .................. 123/339.16; 123/481; 123/501; 60/599
(58) Field of Search ....................... 123/339.16, 339.24, 123/481, 198, 501, 502, 1 A, 563; 60/599

(56) References Cited

U.S. PATENT DOCUMENTS

| 4,379,332 | A | * | 4/1983 | Busser et al. ............... 701/105 |
| 4,819,606 | A | * | 4/1989 | Kawano ...................... 123/502 |
| 5,709,196 | A | * | 1/1998 | Coleman et al. ............ 123/672 |
| 6,325,044 | B1 | * | 12/2001 | Chen et al. .................. 123/357 |
| 6,571,765 | B2 | * | 6/2003 | Kuboshima et al. ........ 123/305 |
| 6,637,381 | B2 | * | 10/2003 | Stanglmaier et al. ..... 123/25 F |
| 6,644,272 | B2 | * | 11/2003 | Furukawa et al. .......... 123/378 |
| 6,755,180 | B2 | * | 6/2004 | Ishida ........................ 123/450 |

FOREIGN PATENT DOCUMENTS

| JP | 62-101846 A | 5/1987 |
| JP | 2001-342838 A | 12/2001 |

* cited by examiner

Primary Examiner—John T. Kwon
(74) Attorney, Agent, or Firm—Frishauf, Holtz, Goodman & Chick, P.C.

(57) ABSTRACT

A diesel engine capable of favorably preventing the generation of white smoke even when an engine load is shifted from a high load side to a low load side. For this purpose, a diesel engine (1) includes fuel injection timing control means (42) for controlling fuel injection timing, the fuel injection timing control means (42) advances the fuel injection timing by predetermined time when an engine load becomes a predetermined load (Ff) or lower in an engine stopping step of stopping the diesel engine while gradually reducing the engine load.

24 Claims, 3 Drawing Sheets

DIESEL ENGINE

TECHNICAL FIELD

The present invention relates to a diesel engine.

BACKGROUND ART

Various means for reducing NOx and reducing fuel consumption under a high load, and curbing the generation of white smoke under a low load are developed in a diesel engine having a supercharger (hereinafter, simply abbreviated as an engine in some cases). As such means, the one in which heat exchanging means is provided between an outlet of a supercharger and a combustion chamber, the heat exchanging means is constituted of a first heat exchanger at an upstream side and a second heat exchanger at a downstream side, a first and a second media having different temperatures are used for heat exchange in the first and the second heat exchangers, and after heat exchange is carried out between these first and second media and charge air, the charge air is fed into the combustion chamber (for example, patent document 1). Here, patent document 1 refers to Japanese Patent Laid-open No. 2001-342838, and the above means is described especially on page four and FIG. 1.

In concrete, according to the means described in patent document 1, the first medium at a low temperature is used in the first heat exchanger at the upstream side, and the second medium at a high temperature is used in the second heat exchanger at the downstream side. In the situation where the engine load (hereinafter, simply called a load in some cases) is light with a low fuel injection rate and white smoke is easily generated, the charge air cooled in the first heat exchanger is heated in the second heat exchanger, and the heated charge air is fed into the combustion chamber to improve ignitability and curb the generation of white smoke. On the other hand, in the situation where the engine load is heavy with a high fuel injection rate, NOx increases and fuel consumption increases, the flow of the second heat medium supplied to the second heat exchanger is eliminated or reduced, and the charge air cooled in the first heat exchanger is fed into the combustion chamber while the air is at a low temperature, thus reducing NOx and fuel consumption.

However, when the load is shifted from a high load side to a low load side, the diesel engine generally becomes unstable in its ignitability with the fuel injection rate being reduced, irrespective of the presence or absence of a supercharger and heat exchanging means. For this reason, for example, when a diesel engine is used to drive a motor and the like, the engine has more unstable ignitability and easily generates while smoke in an engine stopping step in which the load continues to be reduced to stop the engine while the engine speed is kept constant, and the fuel injection rate continues to be reduced following this. Accordingly, the development of the diesel engine capable of curbing the generation of white smoke in such a case is desired.

The above problem is prominent especially when a fuel with low ignitability such as an emulsion fuel is used, and when the engine load is below a predetermined engine load, a non-combusted fuel increases due to reduction in ignitability, thus easily generating white smoke.

Further, with the means in patent document 1, the second medium is also supplied to the second heat exchanger when the engine load is reduced from the state in which the engine load is a high load, and the fuel injection rate is reduced. However, in this situation, the second heat exchanger is cooled with charge air at a low temperature, which circulates under the high load, and therefore the heat of the second medium is depleted by (the metal components and the like of) the second heat exchanger itself. Thus, the second heat exchanger is not sufficiently heated, and it cannot warm the charge air immediately. For this reason, for some period of time after the engine load is shifted from the high load side to the low load side, less fuel exists and the charge air at a low temperature is supplied, and therefore white smoke is generated.

SUMMARY OF THE INVENTION

An object of the present invention is to provide a diesel engine capable of favorably preventing the generation of white smoke even when an engine load is shifted from a high load side to a low load side.

A diesel engine according to the present invention comprises: fuel injection timing control means for controlling fuel injection timing; and the fuel injection timing control means advances the fuel injection timing by a predetermined time when an engine load becomes a predetermined load or lower in an engine stopping step of stopping the diesel engine while gradually reducing the engine load.

In the above constitution, when the engine load becomes the predetermined load or lower during the engine stopping step, the fuel injection timing is advanced by the fuel injection timing control means. Consequently, even under a low load with a low fuel injection rate, more fuel is injected until ignition by the amount provided by advancing the fuel injection timing to improve ignitability and enhance combustion efficiency at the time of ignition, and the generation of white smoke is curbed.

In the diesel engine: it is desirable that charge air temperature detecting means for detecting charge air temperature is further included; and that the fuel injection timing control means controls the fuel injection timing based on a detection signal from the charge air temperature detecting means.

If the optimal fuel injection timing corresponding to the charge air temperature and the fuel injection rate (engine load) is previously determined as a map, the fuel injection timing control means can determine accurate fuel injection timing based on the detection result in the charge air temperature detecting means, and it is possible to always inject the fuel in the optimal fuel injection timing. Accordingly, as long as the engine is driven in such a state, even if the engine load becomes a predetermined load or lower and it becomes necessary to advance the fuel injection timing, the extent of advance of the fuel injection timing can be made the same irrespective of the charge air temperature in the fuel injection timing control means, thus making the control easy. For example, the optimal fuel injection timing for each fuel injection rate (engine load) differs in the case of the charge air temperature of 30° C. and in the case of that of 40° C., but when the engine load becomes the predetermined load or lower, each fuel injection timing may be advanced by the same extent irrespective of the charge air temperature, thus making the control easy. It is possible to detect the charge air temperature at the point of time when the engine load becomes the predetermined load or lower instantly, and advance the fuel injection timing according to the detection result. Accordingly, when the charge air at a lower temperature flows in, the control to further advance the fuel injection timing or the like is carried out, thus making it possible to respond to the fuel or the like with low ignitability reliably, and preventing the generation of white smoke reliably.

In the diesel engine: it is desirable to further include reduced cylinder operation control means for stopping fuel supply to at least one combustion chamber being one part out of a plurality of combustion chambers when the engine load becomes a predetermined load or lower during the engine stopping step.

According to the above constitution, when the load becomes light when the engine stops, for example, in a V type engine, one-bank operation using only the combustion chambers of one bank is performed by the reduced cylinder operation means, and the load per cylinder in the one bank is increased to curb the generation of white smoke.

In the diesel engine: it is desirable that a fuel used comprises a water emulsion fuel. Since the water emulsion fuel has low ignitability, the variation of the engine load gives a larger influence to the ignitability, and white smoke is easily generated. For this reason, it is more useful to apply the present invention to the diesel engine using such a fuel, because ignition is promoted and the combustion with the generation of white smoke being curbed can be realized.

In the diesel engine: it is desirable that a supercharger for pressurizing intake outside air and supercharging it into at least one combustion chamber (or into a plurality of combustion chambers); heat exchanging means constituted by including a first heat exchanger for receiving a first medium to exchange heat with charge air from an outlet of the supercharger, and a second heat exchanger for receiving a second medium having a higher temperature than the first medium and exchanging heat with the charge air from an outlet of the first heat exchanger; and flow control means for controlling a flow of the second medium flowing into the second heat exchanger are further included; that the flow control means eliminates or reduces the flow of the second medium to the second heat exchanger when the engine load exceeds a predetermined load, and increases the flow of the second medium to the second heat exchanger when the engine load becomes the predetermined load or lower; and the fuel injection timing control means advances the fuel injection timing for a predetermined period of time during which the flow of the second medium to the second heat exchanger is shifted to a flow increase side from absence or a flow decrease side by the flow control means.

In the case with use of the heat exchanger, when the engine load becomes the predetermined load or lower in the process in which the engine load is shifted from the high load side to the low load side, the flow control means makes the second medium flow into the second heat exchanger cooled by the charge air circulated under the high load. Accordingly, the heat of the second medium is depleted and the charge air is not sufficiently heated as in the prior art, but in the present invention, the fuel injection timing is advanced by the fuel injection timing control means in this situation. As a result, even if the charge air insufficiently heated is supplied under a low load at a low fuel injection rate, more fuel if injected until ignition by the amount provided by advancing the injection timing as described above, and thus the combustion efficiency at the time of ignition is enhanced to curb the generation of white smoke.

When the fuel injection timing is advanced, the combustion efficiency generally becomes high and the fuel consumption is improved, but on the other hand, the combustion temperature becomes high and NOx is easily generated. However, in the present invention, the charge air supplied to the engine is not sufficiently heated and at a low temperature, and therefore combustion temperature does not significantly rise, which does not increase NOx. In other words, by setting the injection timing, the injection time and the like within the range in which NOx does not increase, the generation of white smoke can be curbed at the same time while reduction in NOx and reduction in fuel consumption are kept.

In the diesel engine: it is desirable that the diesel engine comprises a water cooling type which uses cooling water; the first medium comprises outside air; and the second medium comprises the cooling water. In the diesel engine like this, the cooling water of the diesel engine is also used especially as the second medium, and therefore it is not necessary to circulate a special medium exclusively, thus making such a system unnecessary to make it easy to obtain the second medium.

BEST MODE FOR CARRYING OUT THE INVENTION

An embodiment of the present invention will be explained hereinafter based on the drawings.

Figure 1:
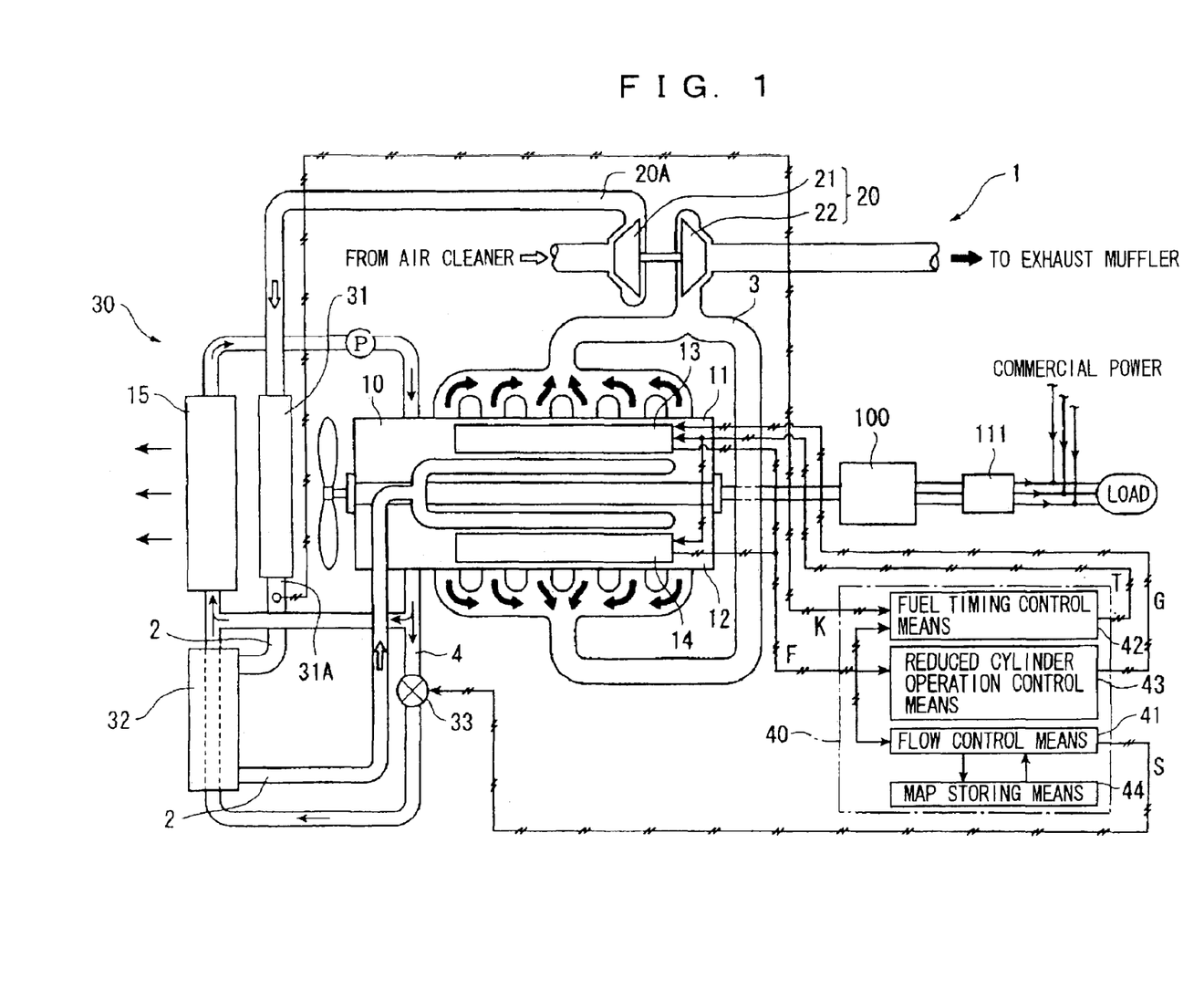
FIG. 1 is a block diagram showing a schematic constitution of a diesel engine according to an embodiment of the present invention.

FIG. 1 is a block diagram showing a schematic constitution of a diesel engine 1 according to the present embodiment. The diesel engine 1 is installed in a power generating system placed in a factory, a building, a large store or the like, and is used as a driving source of a generator 100 for a three-phase alternating current. A fuel is not especially limited, and a water emulsion fuel (water content of 50%) with lower ignitability as compared with light oil is used in this embodiment. Methanol, fuel oil A, a waste plastic fuel and the like can be also used other than the above as the fuel with low ignitability. The diesel engine 1 is a so-called V type engine and a water cooling type including a supercharger 20.

Accordingly, an engine main body 10 of the diesel engine 1 includes a first bank 11 and a second bank 12 separated at suitable banking angles, and the banks 11 and 12 are respectively provided with fuel injection devices 13 and 14 each constituted of an electronic governor, a fuel injecting plunger and the like. Charge air is supplied to these banks 11 and 12 through a charge air channel 2 from a compressor 21 side of the supercharger 20. In the charge air channel 2, heat exchanging means 30 is provided between the supercharger 20 and a combustion chamber inlet (not shown) of the engine main body 10. It should be noted that the supercharger 20 is an exhaust turbine supercharger including an exhaust turbine 22 integrated with the compressor 21, and the exhaust turbine 22 is provided at a midpoint of an exhaust channel 3.

The heat exchanging means 30 includes an air cooling after-cooler (first heat exchanger) 31 for receiving outside air (first medium) and exchanging heat with charge air from a supercharger outlet 20A, and a water cooling after-cooler (second heat exchanger) 32 for receiving engine cooling water (second medium) higher in temperature than the outside air and exchanging heat with the charge air from an air cooling after-cooler outlet (first heat exchanger outlet) 31A. In this situation, the cooling water is for cooling the engine main body 10 and circulates in a cooling water channel 4, heat is mainly exchanged by a radiator 15, and the cooling water is returned to the engine 1. A flow regulating valve 33 is provided at a midpoint in the cooling water channel 4. By opening the flow regulating valve 33, cooling water flows into the water cooling type after-cooler (hereinafter, the after-cooler is abbreviated as the A/C) 32, and by closing it, the cooling water only flows to the radiator 15 side.

According to the heat exchanging means 30, as described in the Background Art, it is possible to heat the charge air cooled in the air cooling A/C 31 in the water cooling A/C 32, feed the heated charge air into the combustion chamber to improve ignitability and curb the generation of white smoke in the situation in which the engine load is light, the fuel injection rate is low and while smoke is easily generated. On the other hand, in the situation in which the engine load is heavy, the fuel injection rate is high, NOx increases, and fuel consumption is increased, it is possible to eliminate or reduce the flow of the cooling water supplied to the water cooling A/C 32, feed the charge air cooled in the air cooling A/C 31 into the combustion chamber while the charge air is at a low temperature, and reduce NOx and fuel consumption.

In the engine 1 as described above, each of the fuel injection devices 13 and 14 is electrically connected to an engine controller 40. The engine controller 40 includes flow control means 41, fuel injection timing control means 42, a reduced cylinder operation control means 43, a map (not shown) to determine a suitable fuel injection rate corresponding to an engine load, and map storing means 44 in which a map M shown in FIG. 2 and the like are stored, other than fuel injection rate control means (not shown) for determining the fuel injection rate corresponding to the engine load.

Figure 2:
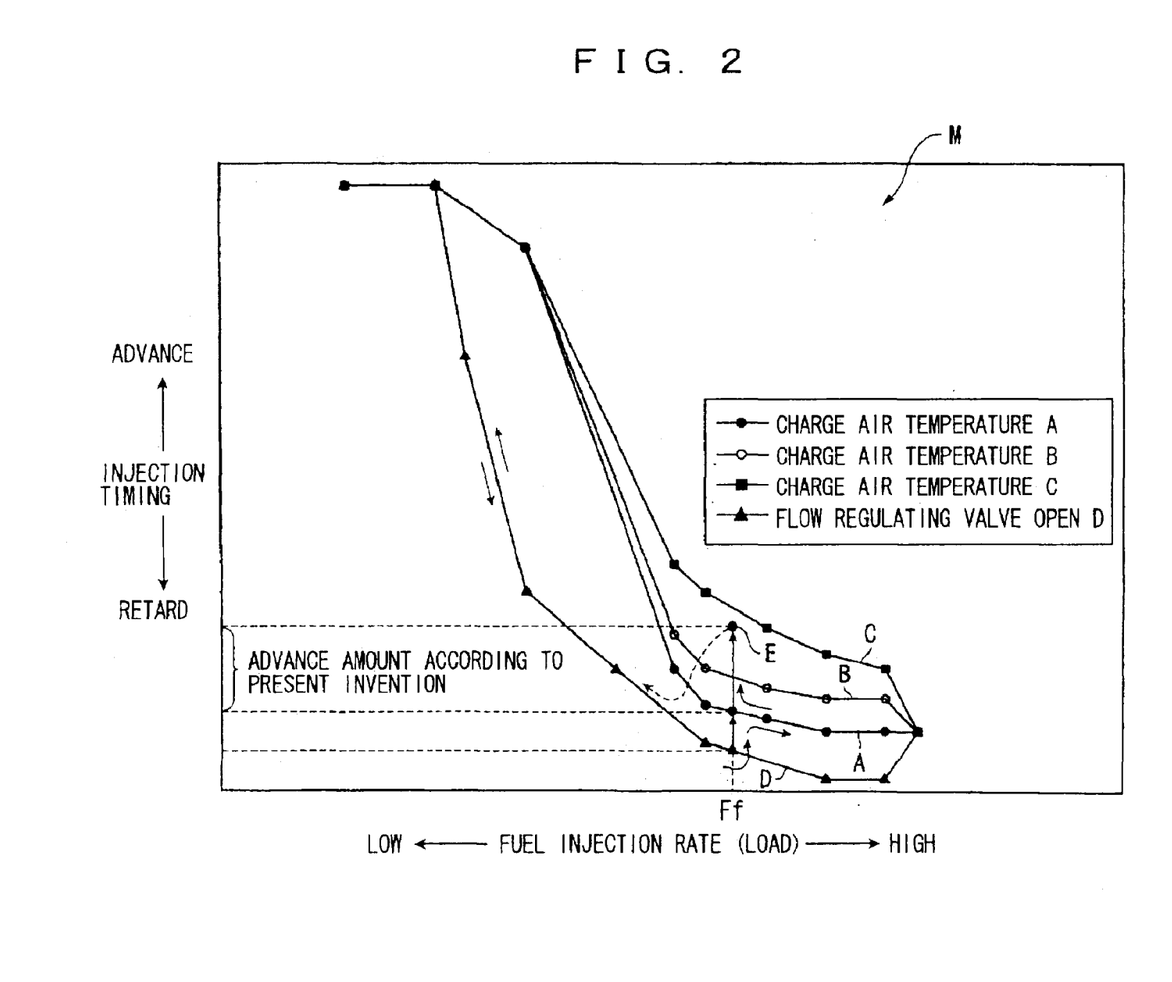
FIG. 2 is a diagram showing relationship between a fuel injection rate and fuel injection timing according to the embodiment.

Here, the map M shown in FIG. 2 is used to determine a fuel injection timing correspondingly to the fuel injection rate (engine load). Namely, when the engine load is light, and the fuel injection rate is low, the fuel is injected at a position where a position of a rotational angle of a crank is more advanced, namely, at an advanced position. As the engine load is increased, and the fuel injection rate becomes higher, the fuel is injected at a position where the position of the rotational angle of the crank is more retarded, namely, at a retarded position. In this embodiment, a map curve corresponding to the charge air temperature at the air cooling A/C outlet 31A is selected. For example, in FIG. 2, map curves of charge air temperatures A, B, and C are drawn, and when the charge air temperature is A, the map curve A is selected, when the charge air temperature is B, the map curve B is selected, and when the charge air temperature is C, the map curve C is selected. Naturally, at temperatures other than the A to C, a suitable complement is made by the fuel injection timing control means 42, and the optimal fuel injection timing corresponding to the charge air temperature is determined.

The flow control means 41 controls the flow of the cooling water flowing into the water cooling A/C 32 correspondingly to the fuel injection rate indicating the engine load, so that the heat exchanging means 30 is made to function to be able to obtain the aforementioned effect. In concrete, it monitors a fuel injection rate signal F outputted from each of the fuel injection devices 13 and 14. When the fuel injection rate is a predetermined fuel injection rate Ff (FIG. 2) or lower as in the case in which the engine load is light, the flow control means 41 outputs an on-off signal S to the flow regulating valve 33 to control the flow regulating valve 33 so that the flow regulating valve 33 is fully opened, or the flow into the water cooling A/C 32 increases. On the other hand, when the fuel injection rate exceeds the predetermined fuel injection fate Ff as in the case in which the engine load is heavy, the flow control means 41 outputs the on-off signal S to the flow regulating valve 33 again, and controls the flow regulating valve 33 so that it is fully closed or the flow into the water cooling A/C 32 is decreased.

The fuel injection timing control means 42 receives a detection signal K from a temperature sensor (charge air temperature detecting means) 34 provided at the air cooling A/C outlet 31A, and determines which one of the map curves A to C shown in FIG. 2 it selects based on the detection signal K. The fuel injection timing control means 42 determines the fuel injection timing corresponding to the fuel injection rate indicating a load, based on the fuel injection rate signals F from the fuel injection devices 13 and 14, and returns injection timing signals T to the fuel injection devices 13 and 14. When the fuel injection rate is gradually increased from a low rate side, the flow control means 41 brings the flow regulating valve 33 in an open state, and a control to warm the charge air in the water cooling A/C 32 is performed. For this reason, until the fuel injection rate reaches the predetermined fuel injection rate Ff, the map curve D is selected irrespective of the charge air temperature. Accordingly, at an early stage of increasing the engine load, the fuel injection timing is retarded along the map curve D as the load becomes heavier, and when the load becomes higher than the predetermined load and the fuel injection rate exceeds the predetermined fuel injection rate Ff, the fuel injection timing is advanced to the fuel injection timing corresponding to the charge air temperature. In FIG. 2, the arrows are given along the map curves A and D so that the shift of the fuel injection timing when the charge air temperature is A can be noticed.

Further, the fuel injection timing control means 42 in the present embodiment has the following function. Namely, it reduces the load from the high load state to reduce the fuel injection rate so as to make the load substantially zero in the end as in the case in which the engine is stopped. Then, if the fuel injection rate is the predetermined fuel injection rate Ff or lower in the present embodiment with use of the water emulsion fuel, the ignitability is reduced because the fuel injection rate is low, and therefore the flow control means 41 feeds the cooling water into the water cooling A/C 32 to warm the charge air at this stage. However, the cooling water flows into the water cooling A/C 32 that is cooled and is deprived of its heat, the water cooling A/C 32 does not sufficiently function, thus generating white smoke, and therefore the fuel injection timing control means 42 controls the fuel injection timing so as to prevent the generation of the white smoke in this situation. Namely, the fuel injection timing is advanced by a predetermined angle.

In concrete, if it is assumed that the charge air temperature is A, the load is reduced from the state in which the maximum load is charged, and the fuel injection rate is reduced, the flow control means 41 makes the cooling water flow into the water cooling A/C 32 at a point of time when the fuel injection rate becomes the predetermined fuel injection rate Ff or lower. However, on one hand, the fuel injection timing control means 42 advances the fuel injection timing to the position of a point E shown in FIG. 2 to prevent the generation of white smoke in this situation. The degree by which the timing is advanced is a few degrees in the crank angle. The time during which the timing is advanced is a few seconds, which is measured by a timer. After the time is up, the water cooling A/C 32 is warmed to be capable of sufficiently heating the charge air, and therefore if the fuel injection rate is reduced by further reducing the load, the fuel injection timing control means 42 returns the fuel injection timing to any position of the map curve D and gradually advances the timing as shown by the arrow of the dotted line in FIG. 2. In the case of the charge air temperatures of B and C, the degrees and the times by which the timing is advanced are the same as in the case of the charge air temperature A.

The reduced-cylinder operation control means 43 monitors the fuel injection rate signal F from the fuel injection devices 13 and 14, and when the engine load is reduced and the fuel injection rate becomes the predetermined fuel injection rate Ff or lower, it outputs a fuel injection stop signal G to the fuel injection device 13 at the side of the first bank 11 to stop the fuel injection, and carries out one-side bank operation only at the side of the second bank 12. In the diesel engine 1, reduction in the engine load and the fuel injection rate themselves bring about unstable ignitability and possibility of generation of white smoke. For this reason, in this embodiment, a reduced cylinder operation is performed to prevent the generation of white smoke when the fuel injection rate becomes the predetermined fuel injection rate Ff or lower, and ignitability of the water emulsion fuel is significantly reduced. In the present embodiment in which the diesel engine 1 is installed in the power generation system, the engine 1 is completely stopped in many cases when the fuel injection rate is reduced to the predetermined fuel injection rate Ff or lower by reducing the load, and consequently, the above reduced cylinder operation is carried out in an engine stopping step.

Figure 3:
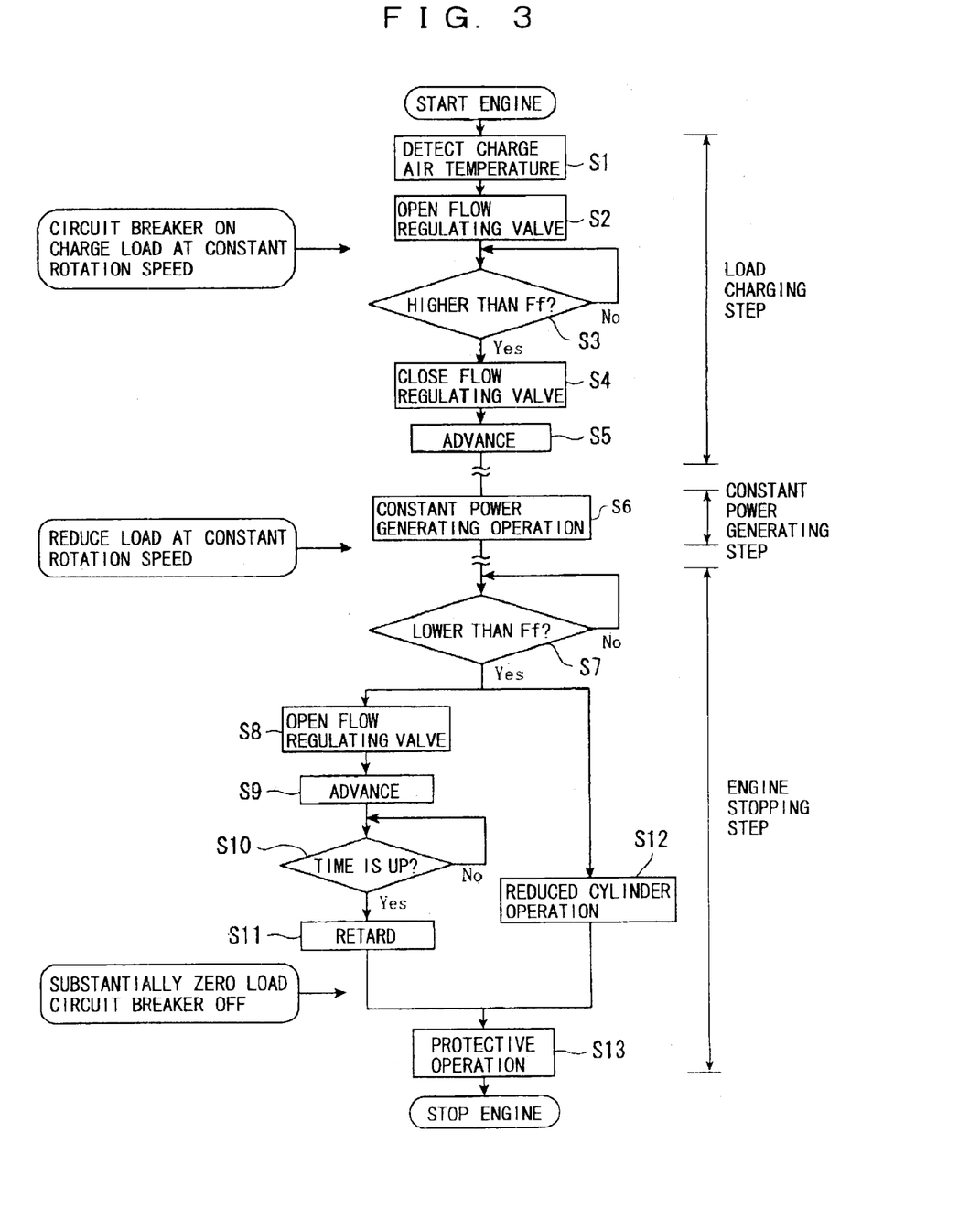
FIG. 3 is a flowchart to explain the embodiment.

The start to the stop of the diesel engine 1 will be explained below with reference to a flowchart in FIG. 3. For convenience of explanation, the charge air temperature is assumed to be A.

Step (hereinafter, abbreviated as S) 1: When the engine 1 is started, the fuel injection timing control means 42 first receives the detection signal K from the temperature sensor 34, and selects the map curve A to determine the fuel injection timing in the case in which the engine load is sufficiently heavy. It should be noted that this detection may be performed at the point of time when the engine load becomes high and the fuel injection rate exceeds the predetermined fuel injection rate Ff.

S2: Since at this stage, there is the possibility that the engine 1 is not sufficiently warmed, the flow control means 41 opens the flow regulating valve 33 until the engine 1 is warmed, and supplies the cooling water to the water cooling A/C 32 to heat the charge air, thereby promoting prevention of the generation of white smoke. Then, the engine 1 is kept at a constant rotation speed, synchronism with commercial power (FIG. 1) is kept, and at the generator 100 side, a circuit breaker 101 is brought to its on position (the state in which the power line is not cut off is established). After the circuit breaker 101 is in its on position, the load is gradually charged while the constant speed rotation is kept, namely, electric power is gradually generated in the generator 100. At the point of time of starting the charge of the load, the load is light, and therefore the fuel injection rate is low, whereby the flow regulating valve 33 is kept open.

S3: When the load is gradually increased, the fuel injection rate also increases following it, and here, the fuel injection timing control means 42 monitors the fuel injection rate signals F from the fuel injection devise 13 and 14 as the load of the engine. The monitoring is continued until the fuel injection rate exceeds the predetermined fuel injection rate Ff, namely, until the load exerted on the engine 1 exceeds the predetermined load.

S4: When it is determined that the fuel injection rate exceeds the predetermined fuel injection rate Ff based on the fuel injection rate signal F, the fuel is reliably ignited, and therefore the flow control means 41 stops supply of the cooling water to the water cooling A/C 32, and allows the charge air to be cooled in the air cooling A/C 31.

S5: Meanwhile, at this stage, the fuel injection timing control means 42 advances the fuel injection timing to inject the fuel in the injection timing corresponding to the charge air temperature A. The load charging step is up to this point.

S6: Thereafter, the load is charged to the maximum to perform a constant power generating operation (constant power generating step).

S7: Next, an engine stopping step will be explained. When the engine 1 is to be stopped for some reason, the load is gradually reduced while the engine speed at the time of power generation is kept constant. The fuel injection rate is monitored as the load. In this situation, the flow control means 41, the fuel injection timing control means 42, and the reduced cylinder operation control means 43 directly monitor the fuel injection rate signal F at the same time in this embodiment, but any one of the means may monitor it and this means may outputs a trigger signal to the other means.

S8: When the engine load is decreased, and the fuel injection rate becomes the predetermined fuel injection rate Ff or lower, namely, when the load becomes the predetermined load or lower, the flow control means 41 fully opens the flow regulating valve 33 or opens it to the flow increase side to feed the cooling water into the water cooling A/C 32.

S9, S10: At the same time as the above, the fuel injection timing control means 42 advances the fuel injection timing to the point E for a predetermined period of time. As a result, even when the cooling water is deprived of heat in the cooled water cooling A/C 32 and the charge air is not sufficiently heated, the generation of white smoke is prevented.

S11: Thereafter, the fuel injection timing is retarded, and is controlled along the map curve D.

S12: In addition to this, the reduced cylinder operation control means 43 outputs the fuel injection stop signal G to the fuel injection device 13 to stop combustion at the side of the first bank 11, and carries out the one-bank operation by the combustion at the side of the second bank 12. At the stage in which the engine load is made substantially zero, the circuit breaker is brought to its off position.

S13: Thereafter, a protective operation at a low engine speed (low idle) is performed for a predetermined period of time to prevent seizing or the like of the supercharger 20, and the engine 1 is stopped. The one-bank operation is continued until the engine stops.

According to this embodiment as above, the following effects are provided.

(1) In the diesel engine 1, when the engine load becomes the predetermined load or lower during the engine stopping step, namely, when the fuel injection rate becomes the predetermined fuel injection rate Ff or lower, the fuel injection timing control means 42 advances the fuel injection timing. As a result, even under a low load at a low fuel injection rate, more fuel is injected until ignition by the amount provided by advancing the injection timing, thus making it possible to improve ignitability, increasing the combustion efficiency at the time of ignition to make it possible to curb the generation of white smoke.

(2) In the diesel engine 1, the optimal fuel injection timing corresponding to the charge air temperature and the fuel injection rate (engine load) is previously determined as the map M. According to this, the fuel injection timing control means 42 can select the accurate map curve based on the detection signal K from the temperature sensor 34 and can always inject the fuel in the optimal fuel injection timing. Accordingly, as long as the engine 1 is driven in such a state, the fuel injection timing control means 42 only has to advance the fuel injection timing by the same crank angle irrespective of the charge air temperature even when the fuel injection rate becomes the predetermined fuel injection rate Ff or lower and the fuel injection timing needs to be advanced, thus making it possible to facilitate the control.

(3) The charge air temperature at the point of time when the fuel injection rate becomes the predetermined fuel injection rate Ff is instantly detected and the fuel injection timing can be advanced in accordance with the detection result. Due to this, when the charge air at a lower temperature flows in, the control to advance the fuel injection timing or the like is performed, thereby making it possible to respond to a water emulsion fuel and the like with low ignitability reliably, and curb the generation of white smoke reliably.

(4) The diesel engine 1 includes the reduced cylinder operation control means 43, and when the fuel injection rate becomes the predetermined fuel injection rate Ff or lower during the engine stopping step, the one-side bank operation is performed. Due to this, even when the load becomes low, the load per cylinder at the second bank 12 is increased and an operation can be performed at a higher fuel injection rate, thus making it possible to curb the generation of white smoke.

(5) Since the water emulsion fuel that is the fuel for the diesel engine 1 has low ignitability, the variation of the engine load, that is, the variation of the fuel injection rate gives a larger influence to the ignitability, and thus white smoke is easily generated. Due to this, it is more useful to apply the present invention in application to the diesel engine 1 using such a fuel, because it can promote ignition and realize combustion with the generation of white smoke being curbed.

(6) When the fuel injection rate becomes the predetermined fuel injection rate Ff or lower (namely, when the engine load becomes the predetermined load or lower in the process in which the engine load is shifted from the high load side to the low load side), the flow control means 41 makes the cooling water flow into the water cooling A/C 32 cooled with the charge air circulating under the high load. Accordingly, the heat of the cooling water is depleted and the charge air is not sufficiently heated as in the prior art. However, since the fuel injection timing is advanced by the fuel injection timing control means 42 in the present embodiment, more fuel can be injected until ignition by the amount provided by advancing the fuel injection timing even if the charge air insufficiently heated is supplied, as explained in (1), and therefore the combustion efficiency at the time of ignition is enhanced to make it possible to curb the generation of white smoke. With the enhanced combustion efficiency, the fuel consumption can be reduced.

(7) When the injection timing of the fuel is advanced, the fuel consumption is reduced with the combustion efficiency being enhanced, but on the other hand, the combustion temperature becomes high, and NOx is easily generated. However, in the present embodiment, in the step in which the injection timing is controlled to advance, the load is originally light, and the NOx generation is less, in addition to which, the injection timing is advanced by the extent to which the supplied charge air is not sufficiently heated, thus making it possible to curb the emission of white smoke with substantially no NOx being increased.

(8) In the diesel engine 1, the cooling water of the diesel engine 1 is also used as the medium of the water cooling A/C 32, thus eliminating the need to exclusively circulate a special medium, and making such a system unnecessary, and therefore the medium can be easily obtained, which is convenient.

It should be noted that the present invention is not limited to the aforementioned embodiment, but includes other constitutions and the like which can attain the object of the present invention, and the modifications and the like as shown below are also included in the present invention.

For example, in the aforementioned embodiment, the load variation is detected by substituting the fuel injection rate for the engine load, but a torque meter may be attached to an output shaft (for example, a shaft portion for connecting the engine 1 and the generator 100) or the like of the engine 1, and the engine load may be detected from such output torque. The power generation amount of the generator is measured with a watt meter or the like, and the power generation amount may be substituted for the engine load to detect the load variation.

In the aforementioned embodiment, the example including both of the fuel injection timing control means 42 and the reduced cylinder operation control means 43, but even the cases without including one of them are included in the diesel engine of the present invention. For example, in the diesel engine including only the reduced cylinder operation control means 43, the supercharger 20, the heat exchanging means 30 and the like may be provided as necessary.

The best constitution, method and the like to carry out the present invention are disclosed in the above description, but the present invention is not limited to this. Namely, the present invention is specially illustrated and explained mainly regarding the specified embodiment, but those who are skilled in the art can add various modifications to the above-described embodiment in the shape, quality, number and amount, and the other detailed constitutions without deviating from the scope of technical idea and the object of the present invention. Accordingly, the description limiting the shape, quality and the like disclosed in the above is the exemplificative description to facilitate understanding of the present invention, but does not intend to limit the present invention, and therefore the descriptions with the names of the components with part of the limitation or the entire limitation of their shapes, qualities and the like being removed are included in the present invention.

What is claimed is:

1. A diesel engine comprising:
  a supercharger for pressurizing outside air and supplying the pressurized air as charge air into combustion chambers;
  a first heat exchanger, provided in a charge air channel extending from an outlet of the supercharger on a compressor side of the supercharger, for receiving a first medium and for exchanging heat with the charge air from the outlet of the supercharger;
  a second heat exchanger, provided in the charge air channel, for receiving a second medium having a higher temperature than the first medium and for exchanging heat with the charge air from an outlet of the first heat exchanger; and
  fuel injection timing control means for controlling a fuel injection timing of a fuel;

wherein the fuel injection timing control means advances the fuel injection timing for a predetermined period of time when an engine load on the diesel engine is shifted to a low load from a high load and decreases to a predetermined level.

2. The diesel engine according to claim 1, further comprising charge air temperature detecting means for detecting a temperature of the charge air;
wherein the fuel injection timing control means controls the fuel injection timing based on a detection signal from the charge air temperature detecting means.

3. The diesel engine according to claim 2, further comprising reduced cylinder operation control means for stopping fuel supply to at least one of the combustion chambers when the engine load decreases to the predetermined level.

4. The diesel engine according to claim 3, wherein the fuel comprises a water emulsion fuel.

5. The diesel engine according to claim 4, further comprising flow control means for controlling a flow of the second medium to the second heat exchanger;
wherein the flow control means (i) at least one of reduces and eliminates the flow of the second medium to the second heat exchanger when the engine load exceeds the predetermined level, and (ii) increases the flow of the second medium to the second heat exchanger when the engine load decreases to the predetermined level; and
wherein the fuel injection timing control means advances the fuel injection timing for the predetermined period of time, when the flow of the second medium to the second heat exchanger is increased by the flow control means.

6. The diesel engine according to claim 5, wherein the diesel engine comprises a water cooling diesel engine using cooling water, and the first medium comprises outside air, and the second medium comprises the cooling water.

7. The diesel engine according to claim 3, further comprising flow control means for controlling a flow of the second medium to the second heat exchanger;
wherein the flow control means (i) at least one of reduces and eliminates the flow of the second medium to the second heat exchanger when the engine load exceeds the predetermined level, and (ii) increases the flow of the second medium to the second heat exchanger when the engine load decreases to the predetermined level; and
wherein the fuel injection timing control means advances the fuel injection timing for the predetermined period of time, when the flow of the second medium to the second heat exchanger is increased by the flow control means.

8. The diesel engine according to claim 7, wherein the diesel engine comprises a water cooling diesel engine using cooling water, and the first medium comprises outside air, and the second medium comprises the cooling water.

9. The diesel engine according to claim 2, wherein the fuel comprises a water emulsion fuel.

10. The diesel engine according to claim 9, further comprising flow control means for controlling a flow of the second medium to the second heat exchanger;
wherein the flow control means (i) at least one of reduces and eliminates the flow of the second medium to the second heat exchanger when the engine load exceeds the predetermined level, and (ii) increases the flow of the second medium to the second heat exchanger when the engine load decreases to the predetermined level; and
wherein the fuel injection timing control means advances the fuel injection timing for the predetermined period of time, when the flow of the second medium to the second heat exchanger is increased by the flow control means.

11. The diesel engine according to claim 10, wherein the diesel engine comprises a water cooling diesel engine using cooling water, and the first medium comprises outside air, and the second medium comprises the cooling water.

12. The diesel engine according to claim 2, further comprising flow control means for controlling a flow of the second medium to the second heat exchanger;
wherein the flow control means (i) at least one of reduces and eliminates the flow of the second medium to the second heat exchanger when the engine load exceeds the predetermined level, and (ii) increases the flow of the second medium to the second heat exchanger when the engine load decreases to the predetermined level; and
wherein the fuel injection timing control means advances the fuel injection timing for the predetermined period of time, when the flow of the second medium to the second heat exchanger is increased by the flow control means.

13. The diesel engine according to claim 12, wherein the diesel engine comprises a water cooling diesel engine using cooling water, and the first medium comprises outside air, and the second medium comprises the cooling water.

14. The diesel engine according to claim 1, further comprising reduced cylinder operation control means for stopping fuel supply to at least one of the combustion chambers when the engine load decreases to the predetermined level.

15. The diesel engine according to claim 14, wherein the fuel comprises a water emulsion fuel.

16. The diesel engine according to claim 15, further comprising flow control means for controlling a flow of the second medium to the second heat exchanger;
wherein the flow control means (i) at least one of reduces and eliminates the flow of the second medium to the second heat exchanger when the engine load exceeds the predetermined level, and (ii) increases the flow of the second medium to the second heat exchanger when the engine load decreases to the predetermined level; and
wherein the fuel injection timing control means advances the fuel injection timing for the predetermined period of time, when the flow of the second medium to the second heat exchanger is increased by the flow control means.

17. The diesel engine according to claim 16, wherein the diesel engine comprises a water cooling diesel engine using cooling water, and the first medium comprises outside air, and the second medium comprises the cooling water.

18. The diesel engine according to claim 14, further comprising flow control means for controlling a flow of the second medium to the second heat exchanger;
wherein the flow control means (i) at least one of reduces and eliminates the flow of the second medium to the second heat exchanger when the engine load exceeds the predetermined level, and (ii) increases the flow of the second medium to the second heat exchanger when the engine load decreases to the predetermined level; and
wherein the fuel injection timing control means advances the fuel injection timing for the predetermined period of time, when the flow of the second medium to the second heat exchanger is increased by the flow control means.

19. The diesel engine according to claim 18, wherein the diesel engine comprises a water cooling diesel engine a using cooling water, and the first medium comprises outside air, and the second medium comprises the cooling water.

20. The diesel engine according to claim 1, wherein the fuel comprises a water emulsion fuel.

21. The diesel engine according to claim 20, further comprising flow control means for controlling a flow of the second medium to the second heat exchanger;

wherein the flow control means (i) at least one of reduces and eliminates the flow of the second medium to the second heat exchanger when the engine load exceeds the predetermined level, and (ii) increases the flow of the second medium to the second heat exchanger when the engine load decreases to the predetermined level; and wherein the fuel injection timing control means advances the fuel injection timing for the predetermined period of time, when the flow of the second medium to the second heat exchanger is increased by the flow control means.

22. The diesel engine according to claim 21, wherein the diesel engine comprises a water cooling diesel engine using cooling water, and the first medium comprises outside air, and the second medium comprises the cooling water.

23. The diesel engine according to claim 1, further comprising flow control means for controlling a flow of the second medium to the second heat exchanger;

wherein the flow control means (i) at least one of reduces and eliminates the flow of the second medium to the second heat exchanger when the engine load exceeds the predetermined level, and (ii) increases the flow of the second medium to the second heat exchanger when the engine load decreases to the predetermined level; and wherein the fuel injection timing control means advances the fuel injection timing for the predetermined period of time, when the flow of the second medium to the second heat exchanger is increased by the flow control means.

24. The diesel engine according to claim 23, wherein the diesel engine comprises a water cooling diesel engine using cooling water, and the first medium comprises outside air, and the second medium comprises the cooling water.

* * * * *